United States Patent [19]

Rustad et al.

[11] Patent Number: 5,442,760
[45] Date of Patent: Aug. 15, 1995

[54] DECODED INSTRUCTION CACHE ARCHITECTURE WITH EACH INSTRUCTION FIELD IN MULTIPLE-INSTRUCTION CACHE LINE DIRECTLY CONNECTED TO SPECIFIC FUNCTIONAL UNIT

[75] Inventors: Einar Rustad; Bjørn O. Bakka; Inge Birkeli, all of Oslo; Nils A. Orthe, Finstadfordet, all of Norway

[73] Assignee: Dolphin Interconnect Solutions AS, Oslo, Norway

[21] Appl. No.: 173,136

[22] Filed: Dec. 22, 1993

Related U.S. Application Data

[63] Continuation of Ser. No. 409,674, Sep. 20, 1989, abandoned.

[51] Int. Cl.$^6$ ................................. G06F 9/30
[52] U.S. Cl. .......................... 395/375; 395/800; 364/232.23; 364/231.8; 364/243.42; 364/DIG. 1
[58] Field of Search ................................. 395/375, 800

[56] References Cited

U.S. PATENT DOCUMENTS

| | | | |
|---|---|---|---|
| 4,136,383 | 1/1979 | Takesue | 364/200 |
| 4,437,149 | 3/1984 | Pomerene et al. | 364/200 |
| 4,468,736 | 8/1984 | DeSantis et al. | 364/200 |
| 4,691,277 | 9/1987 | Kronstadt et al. | 364/200 |
| 4,713,755 | 12/1987 | Worley | 364/200 |
| 4,722,050 | 1/1988 | Lee et al. | 395/375 |
| 4,807,110 | 2/1989 | Pomerene et al. | 364/200 |
| 4,807,115 | 2/1989 | Torng | 364/200 |
| 4,816,997 | 3/1989 | Scales | 364/200 |
| 4,833,599 | 5/1989 | Colwell et al. | 395/650 |
| 4,901,233 | 2/1990 | Liptay | 364/200 |
| 4,903,196 | 2/1990 | Pomerene et al. | 364/200 |
| 4,942,525 | 7/1990 | Shintani et al. | 364/200 |
| 5,021,945 | 6/1991 | Morrison et al. | 395/375 |
| 5,127,092 | 6/1992 | Gupta et al. | 395/375 |
| 5,129,067 | 7/1992 | Johnson | 395/375 |

FOREIGN PATENT DOCUMENTS 20285346  5/1988  European Pat. Off. ...... G06F 12/08

OTHER PUBLICATIONS

Steven et al., "HARP: A Parallel Pipelined RISC Processor", *Microprocessors and Microsystems*, Nov. 1989, No. 9, London, pp. 579–587.

Colwell et al., "VLIW Architecture for a Trace Scheduling Compiler", *IEEE Transactions on Computers*, vol. 37, No. 8, Aug. 1988, pp. 967–979.

*Primary Examiner*—William M. Treat
*Attorney, Agent, or Firm*—Ladas & Parry

[57] ABSTRACT

A general purpose computer system is equipped with apparatus for enabling a processor to provide efficient execution of multiple instructions per clock cycle. The major feature is a decoded instruction cache with multiple instructions per cache line. During run time cache hits, the decode logic fills the cache line with instructions up to its limit. During run time cache misses, the cache line enables the processor to dispatch multiple instructions during one clock cycle. Hereby is achieved high performance with a simple, but still powerful, decode and dispatch logic.

An important feature of the instruction cache is that it holds the target addresses for the next instructions. No separate address logic is needed to proceed in the program execution during cache hits. A conditional branch holds its alternative target address in a separate field. This enables the processor, to a large degree, to be independent of the conditional branch bottleneck.

8 Claims, 7 Drawing Sheets

| MEMORY ADDRESS | MEMORY | CACHE ADDRESS | CACHE | | | |
|---|---|---|---|---|---|---|
| . | . | | | | | |
| | . | | | | | |
| xxxxxx06 | g | | | | | |
| xxxxxx05 | f | | . | | | |
| xxxxxx04 | e | xxxx04 | q | . | . | . |
| xxxxxx03 | d | xxxx03 | m | n | o | p |
| xxxxxx02 | c | xxxx02 | i | j | k | l |
| xxxxxx01 | b | xxxx01 | e | f | g | h |
| xxxxxx00 | a | xxxx00 | a | b | c | d |

Fig. 7 Address and content relation between cache and memory in a conventionally organized instruction cache.

| MEMORY ADDRESS | MEMORY | CACHE ADDRESS | CACHE | | | |
|---|---|---|---|---|---|---|
| xxxxxx10 | i | xxxx10 | free | - | - | - |
| xxxxxx07 | h | xxxx07 | free | - | - | - |
| xxxxxx06 | g | xxxx06 | free | - | - | - |
| xxxxxx05 | f | xxxx05 | f | g | h | i |
| xxxxxx04 | e | xxxx04 | free | - | - | - |
| xxxxxx03 | d | xxxx03 | d | e | | |
| xxxxxx02 | c | xxxx02 | free | - | - | - |
| xxxxxx01 | b | xxxx01 | free | - | - | - |
| xxxxxx00 | a | xxxx00 | a | b | c | |

Fig. 8 Address and contents relations between memory and an Instruction Folding cache with one directory (not shown).

| MEMORY ADDRESS | MEMORY | | CACHE ADDRESS | CACHE | | | |
|---|---|---|---|---|---|---|---|
| xxxxxx10 | i | Y | xxxxxx10 | free | - | - | - |
| xxxxxx07 | h | X | xxxxxx07 | free | - | - | - |
| xxxxxx06 | g | W | xxxxxx06 | W | X | Y | - |
| xxxxxx05 | f | V | xxxxxx05 | f | g | h | i |
| xxxxxx04 | e | U | xxxxxx04 | U | V | - | - |
| xxxxxx03 | d | T | xxxxxx03 | d | e | | |
| xxxxxx02 | c | S | xxxxxx0 | free | - | - | - |
| xxxxxx01 | b | R | xxxxxx01 | R | S | T | |
| xxxxxx00 | a | Q | xxxxxx00 | a | b | c | Q |

Fig. 9 Address contents relation between memory and Instruction folding cache with two directories (not shown).

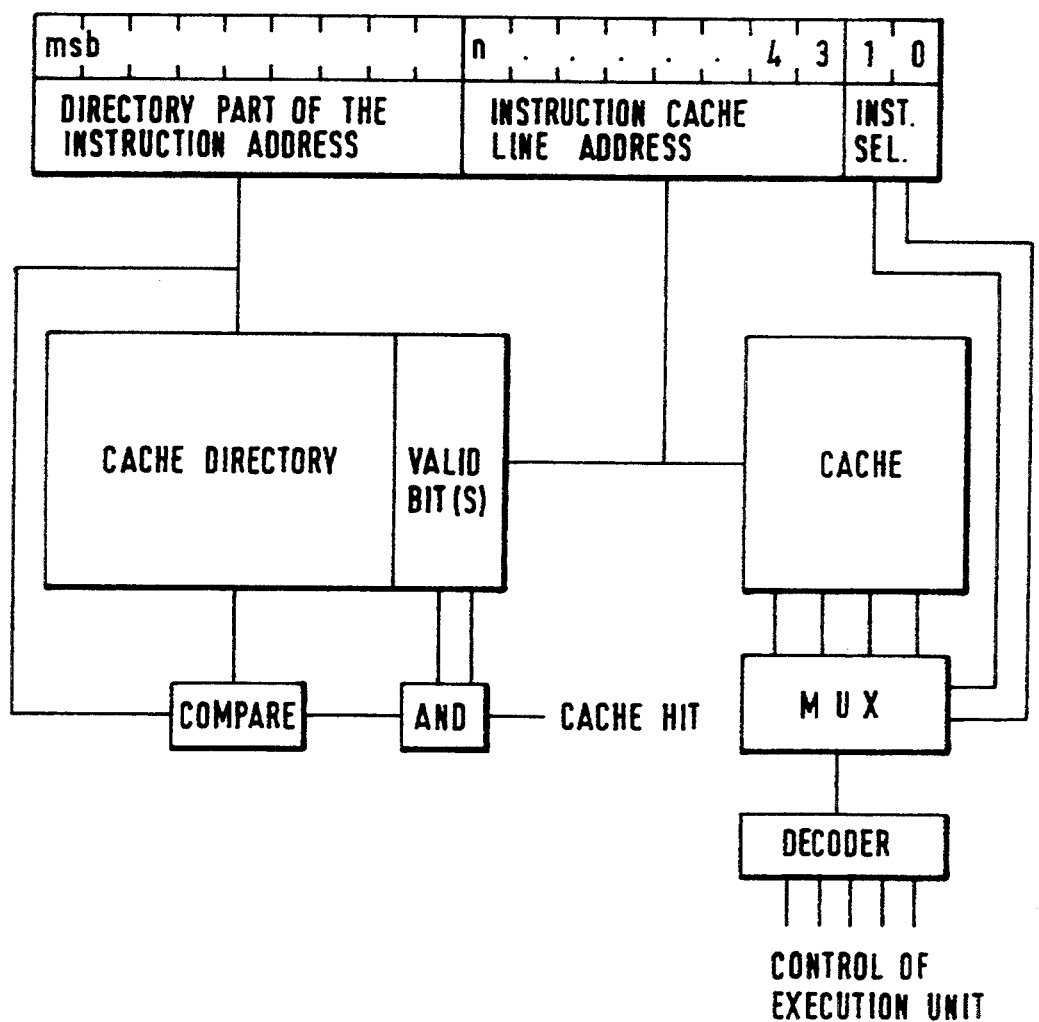
Fig .10 Instruction cache address for conventional cache:

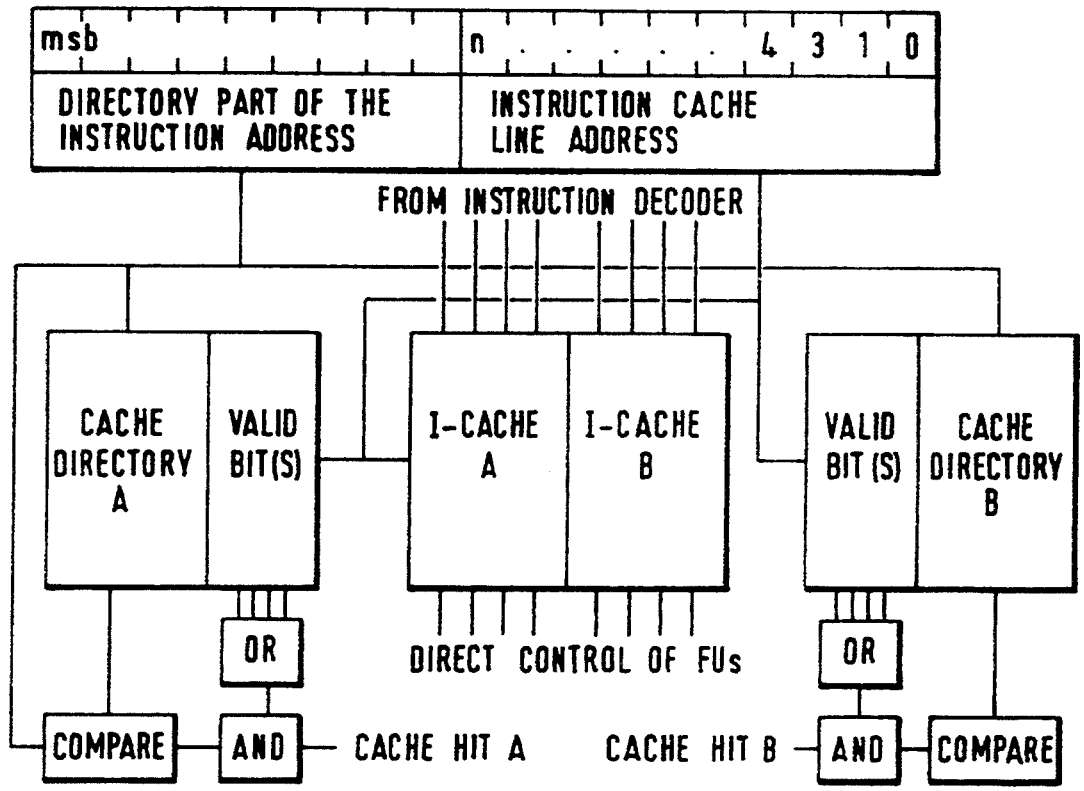
Fig. 11 Instruction cache addressing for the present invention with two directories.
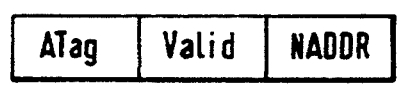
DAC — DATA ADDRESS CONTROL
IALU1 — INTEGER ALU1
FU — FLOATING UNIT or IALU2
AUX — AUXILIARY ADDRESS
ATag — ADDRESS Tag
Valid — INSTRUCTION VALID BITs
NADDR — NEXT ADDRESS
Fig. 12 Format of a basic decoded block and a subdirectory

DECODED INSTRUCTION CACHE ARCHITECTURE WITH EACH INSTRUCTION FIELD IN MULTIPLE-INSTRUCTION CACHE LINE DIRECTLY CONNECTED TO SPECIFIC FUNCTIONAL UNIT

This is a continuation of application(s) Ser. No. 07/409,674 filed on Sep. 20, 1989, now abandoned.

BACKGROUND OF THE INVENTION

The invention has particular relevance to the problem of efficient utilization of multiple execution units in a general purpose computer with separate instruction and data caches, so called Harvard architecture machines. The computer may be of either RISC-type, reduced instruction set computer, or CISC-type, complex instruction set computer, but a RISC set will potentially yield a higher number of instructions in parallel because of its register oriented operands which are few compared to the general operands in CISC machines which usually operate with either 16 or 32 bit operand addresses.

Current trends in the development of increasing parallelism in computers go in two main directions. One is applying multiple general purpose processors and the other is single processors that exhibit the inherent parallelism of programs by internal parallelism with simultaneous execution of multiple instructions.

The main difference between the two directions is the way the parallelism is visible to the programmer. In the multiple processor case, the coarse grained parallelism (CGP) must be utilized by programming parallel algorithms to run on the parallel machine, in the latter case fine grained parallelism (FGP) that exists in any program will be utilized without interference from the programmer.

Any form of parallelism requires housekeeping for keeping consistency in the data shared by the different computing resources in the machine. In the CGP case this housekeeping is done mainly by software with a shared memory system as the communication channel between processors. The memory hierarchy in modern computer systems contains one or more caches per processor, and for efficiency reasons the contents of the caches in a CGP system must be kept coherent by some coherency mechanisms to avoid cache flushing for all communication transfers.

In the FGP case the data consistency is obtained by shared registers between the processing elements. For this purpose a multiported register file with scoreboarding is one solution for making the coherency problem invisible to the program. In a CGP machine each processor is a general purpose computer with its own instruction fetch and issue mechanisms, and it executes a general computer program fetched from its own channel to the memory system and with its own cache.

An FGP machine has one common instruction issue unit for a number of execution units. The state of the art is an instruction issue unit, or dispatch unit, where the instructions are fetched in sequence from the instruction cache. Referring to FIG. 2, the instruction is decoded and dispatched in sequence to one or more special functional units. When the latency of a special functional unit is larger than the dispatch time, there might be parallel operations going on.

The ability of the instruction cache to issue more than one instruction per clock cycle operating on multiple operands would classify it as a multiple instruction multiple data machine (MIMD). Different instructions require different resources within the computer. A straightforward parallel fetch of multiple general instructions from the instruction cache to special functional units is quite complicated when it comes to controlling the different execution units.

Referring to FIG. 1, a full crossbar connectivity can enable instruction dispatching in parallel to special functional units. The crossbar network is placed after the decode units. When more than two instructions are to be treated in parallel, the complexity grows fast. The crossbar network needed grows by the number of instructions fetched in parallel squared. Furthermore, the extra delay added by the crossbar function at this point comes as a direct extension of the processor's cycle time.

When each execution unit is general purpose and can execute all the different processor instructions, the crossbar network is unnecessary. This scheme is depicted in FIG. 4. The simpler approach is done at the expense of hardware resources that are poorly utilized.

If the problem of routing the different instructions to their respective execution units could be solved, other obstacles that inhibit efficient execution of the parallel instructions are still present. Those are the a): dependencies between operands belonging to different instructions, b): data dependant program flow because of conditional branches and c): lack of a free, relevant execution unit.

Regarding a), the relevant data dependencies are the ones that belong to the fraction of the program that resides in the processor (at different stages of computation) at any given time. In the case of such dependencies, there are two major different solutions. The processor must keep track of the right sequence of the instructions to which the dependant operands belong and introduce extra cycles to finish the computation in correct logical order, or the compiler must produce instructions in such an order that no conflicts arise that cause the processor to perform an irrelevant computation, i.e. using wrong operands. Though, in this context no preferred solution to this problem will be discussed, one commonly preferred hardware solution is usually referred to as "scoreboarding".

Regarding b), a high frequency of branches, usually in the 15-20% range, is experienced in all programs. The normal execution of a conditional branch instruction is usually done in the following sequence. The instruction is fetched, decoded and dispatched. While the instruction in question awaits execution, the dispatching may or may not continue. When the branch condition is resolved, the processor must, when the branch is taken, calculate the new target address and continue execution from there. The reason why the conditional branch instructions may be devastating for performance, is that the processor really must await their execution before it continues fetching and dispatching other instructions.

Regarding c), the number of independent execution units limits the number of instructions that may be executed in parallel. Since any fraction of a program usually contains a mix of different instructions, the different execution units may be of different types. A general single instruction processor is usually a collection of several specialized units with some shared resources like instruction and data buses and registers. A major point is to balance the number of different execution units to the instruction mix found in most relevant computer programs. The suggested solution is to have more than one integer ALU, more than one unit for floating point operations, and more than one branch unit when the total number of execution units exceeds 5-6.

Definitions

RISC—Reduced Instruction set Computer
MIMD—Multiple Instruction Multiple Data
ALU—Arithmetic Logical Unit
VLIW—Very Long Instruction Word
IDU—Instruction Decode Unit i. Smith, Johnson and Horowitz (SJ&H) from Stanford University wrote the article "Limits on Multiple Instruction Issue" which appeared at an ACM conference in April 1989. The authors explored the potential of what they name a superscalar processor, i.e. one that is able to issue multiple instructions per cycle. They used a modelled base machine on which they varied some properties. This machine was basis for a trace driven simulation from a typical RISC processor, the MIPS R2000.

The base machine had an instruction fetch unit, a ready-for-execution unit and multiple execution units. The instruction fetch unit was modeled both ideally with unlimited fetch capacity and perfect branch prediction, and non-ideally with 2 or 4 instruction fetch and 85% branch prediction.

The ready-for-execution unit was modeled as a buffer containing either 8, 16 or 32 instructions. Any instructions in the ready-for-execution unit could be issued to an execution unit given a free execution unit and no data dependencies. Two different types of data dependencies was modeled, 'true' which refer to value dependencies and 'all' which also includes situations where two values 'accidently' happen to share the same register.

The execution was done by either nine or eleven units with different latencies. The nine units were, with latencies in parenthesis: Integer ALU (1), Barrel Shifter (1), Load Pipe (2), Store Pipe (0), Branch Unit (1), FP Adder (6), FP Multiplier (6), FP Divider (12) and FP Convert (4). The model with eleven units had an additional Integer ALU and an additional Load Pipe.

The authors quote that the 'results indicate that there exists enough instruction-level concurrency in highly-optimized code to support an approximate two-times speedup in performance'. Their best result was a 4.1 times increase with an ideal fetch unit, an instruction buffer of size 32, checking only true data dependencies and 11 execution units.

As soon as SJ&H reduced either of these factors to the second best, the average issue rate dropped significantly. Most dramatical was a non-ideal fetch unit or an all dependencies check where the speedup factor was about 2.3, while a buffer size of 8 resulted in a speedup drop to 3.0. The results they found with the least optimal organization was a speedup to 1.9. This model included an ideal fetch unit, a buffer size of 8, checking all dependencies and 9 execution units.

SJ&H discussed the restrictions any instruction fetch limitations placed on multiple instruction issue in a fairly long section. The median run length between branches was found to be four instructions. This combined with the fact that the target instructions seldom are aligned and the problem of doing perfect branch prediction, they found that a two-instruction decode stage can supply from 1.3 to 1.8 instructions per cycle.

ii. Jouppi and Wall (J&W) from Digital Equipment Corporation wrote the article "Available Instruction-Level Parallelism for Superscalar and Superpipelined Machines" which appeared at the same conference as the one above. In said article the authors went through several processor architectures capable of exploiting instruction-level parallelism. They based their machine evaluation environment on MultiTitan where they grouped instructions into classes. Each class could be specified an operation latency and a number of functional units. Trace driven simulation was then used to produce the results.

Superscalar machines have a bit different meaning in the article above, i.e. they are capable of issuing multiple instructions per cycle, but their instruction latency is one. Superpipelined machines are capable of issuing only one instruction per cycle, but have instruction latency greater than one (i.e. shorter cycle time). Superscalar superpipelined machines (i.e. the present invention) have properties from both architectures.

J&W say they 'will not consider superscalar machines ... that issue instructions out of order. Techniques to reorder instructions at compile time instead of at run time are almost as good, and are dramatically simpler than doing it in hardware.'

J&W introduce the 'average degree of superpipelining', which is the instruction frequency weighted by the latency. Using this metric they find CRAY-1 to have an average degree of superpipelining of 4.4. Their simulations show that a multiple instruction issue strategy for CRAY-1, given the same instruction latencies, gives almost no benefit. CRAY-1 already exploits the instruction-level parallelism available.

J&W used code optimizing to a large degree. They found that 'most classical optimizations have little effect on the amount of parallelism available, and often actually decreases it.' The reason is that it removes redundant, but often parallel code. Loop unrolling in a careful way was found to be significantly better than just duplicating the loop body. Pipeline scheduling was the single best method to improve parallelism, the increase was from 10% to 60%.

iii. Colwell and others from Multiflow presented a paper on a 1978 ACM conference where they describe their VLIW. The basic characteristics of a VLIW is that it 1) has a single stream of execution, 2) very long instruction format and 3) a large number of datapaths and functional units. They depend to a large degree on compiler technology to handle dependencies and other hazards, i.e, hardware interlocks are not supported.

Multiflow's so-called Trace VLIW is composed of a maximum of four units each capable of executing up to seven instructions simultaneously. Each unit is capable of being a processor by itself. A unit has an Integer board and a Floating board, each with its own register file of 64 32-bit registers. A four unit processor has eight of these register files and eight interconnecting buses. Any functional unit may access any register file, and the usage of the buses is determined at compile time.

Each Integer board can perform one branch test per instruction. There is a software priority scheme when there is more than one unit, so the maximum is a four-way branch. The "most complex piece of hardware in the TRACE" is the instruction cache controller. The processor has an 8 k instruction cache and stores compacted instructions in memory to save memory space.

As can be seen from the above, there is a significant difference in the Multiflow approach compared to our invention. Multiflow is making special compilers that assemble their basic instructions into very long instruction memory lines, that in turn are expanded in the instruction cache, the so-called Very Long Instruction Word (VLIW) architecture. This software control expands the amount of code in main memory by 30% to 50% compared to a usual RISC machine according to Multiflow. A cache image of a memory cell always contains exactly the same information as the memory cell, only expanded to include detailed control information to the execution units. No decoding has taken place.

In the present invention the cache image is different in the way that an address in the cache contains several basic instructions per cache line. Those cache lines are assembled at run-time and are dynamically altered as the program flows through the machine and introduces cache replacements and data dependant program flow. Decoding has taken place.

iv. Intel's latest RISC processor chip, the i860 is a Harvard architecture machine that may fetch one or two instructions per cycle from the instruction cache. The functional units are one integer and one floating point unit. It performs a straight-forward fetch of two instructions at a time controlled by one bit in the instruction code of the integer instruction. The task of preparing the code for parallel operation of the functional units is carried out by software at compile time. The cache architecture of the i860 resembles that of FIG. 4b. The maximum dispatch rate is only two instructions per cycle, and the data path from the instruction cache to the decode logic only two instructions wide. The i860 also has a traditional bit per bit image of the memory stored in the instruction cache.

SUMMARY OF THE INVENTION HEREINAFTER CALLED "INSTRUCTION FOLDING"

This invention considerably improves the dispatching of several instructions in parallel. A major limitation in other designs is that the bandwidth from the instruction cache and through the dispatch unit is too small. Another major limitation is that the latency from the instruction cache, through the decode and execution unit is too long in the case of conditional branches. Our invention solves the bandwidth issue in case of instruction cache hit by having the decode step before the instruction cache. Our invention also solves the conditional branch latency problem described above by including the instruction pointers for both results of the branch instruction.

BRIEF DESCRIPTION OF THE DRAWING

The invention shall now be described in closer detail by referring to non-limiting embodiments thereof and further exemplified by the enclosed drawings, where

FIG. 7 shows a conventional instruction cache where the contents are a bit by bit copy of main memory. The only difference is usually that the instruction cache has a wider organization.

FIG. 8 shows the instruction cache organization of the present invention. The cache entry is identified by the address of the first instruction in a sequence. At least one instruction is cached in that entry. The contents are not a bit by bit copy of main memory.

FIG. 9 shows the instruction cache organization of the present invention with two subdirectories. A single cache line is capable of holding instructions from two different program sequences.

FIG. 10 shows the instruction cache addressing of a conventional cache. An instruction cache with a width of W bytes and a depth of D lines, is accessed by address bits log2(W) through log2(W,D). The LSBs are used to select one instruction at a time.

FIG. 11 shows the instruction cache of the present invention. An instruction cache with a depth of D lines, is accessed by address bits 0 through log2(D). All instructions are fetched in parallel, and the valid bits indicate the instructions that are part of that cache entry.

FIG. 12 shows the format of a basic decoded block and a single subdirectory of the present invention.

DESCRIPTION OF EMBODIMENTS

The scope of the instruction folding principle is to organize an instruction cache that issues multiple instructions to multiple execution units in one clock cycle. Those instructions are located at separate addresses in main memory and/or in a secondary cache. In the first level cache each line is partitioned to control different functional units for dedicated fields in the line, thus overcoming the need for a huge crossbar network for many functional units.

Upon a cache "miss", the instructions will be fetched from secondary cache or main memory, predecoded and routed to the appropriate portion of the line which controls the execution unit needed to perform that particular instruction. This function is repeated until the line is "full" or some other reason makes further folding impossible. To do this at cache miss time minimizes the cycle time and adds little to the miss time. All instructions in this line are associated with the address of the first one in order to define if there is a "hit" or "miss".

Upon a hit, all instructions in the line will be executed in parallel. This means that some of the decoding logic usually located between the cache and the execution unit(s) in conventional machines in this invention is put between the main memory and the instruction cache which now directly controls the execution units.

As mentioned above under b), the address of the next instruction cache line to be fetched is stored in the current line, and thus it is available for fetching the next line without the delay associated with traditional instruction address arithmetic, where in the case of branches the operation is dependent on the current address plus the contents of, say a displacement field, or worse, the contents of a specified register. With a frequency of branches in the 20%–25% range this is of significant importance, especially when multiple instructions are to be executed each clock cycle. Conventional machines utilizing prefetching from an undecoded cache often implement a special cache called a branch target cache with its own directory in order to overcome this problem.

Figure 1:
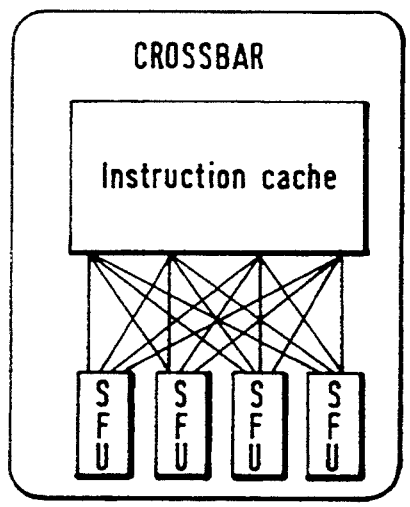
FIG. 1 shows a prior art processor scheme where the instruction issue rate is increased by introducing a full crossbar type of connectivity between the instruction cache and the special functional units.
Figure 2:
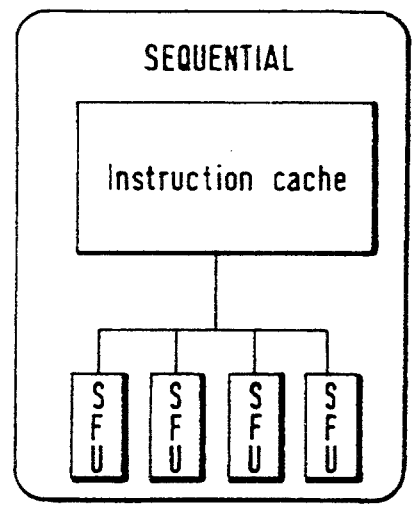
FIG. 2 shows another processor scheme with a conventional organization. Each instruction to be dispatched, is fetched in sequence from the instruction cache and issued in sequence to one or more function units. The issue rate is severely limited by this organization.
Figure 3:
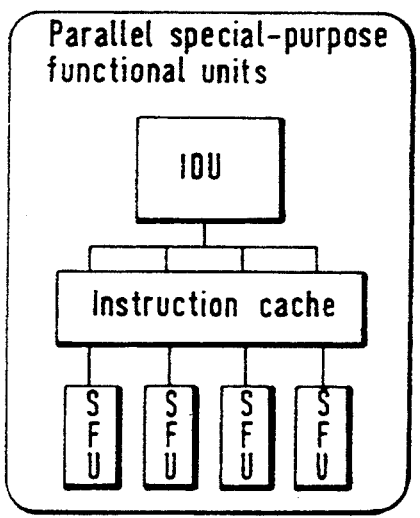
FIG. 3 shows a processor having the organization of the present invention. The decode logic is introduced between the main storage and the cache, and multiple instructions are issued during one clock cycle.
Figure 4:
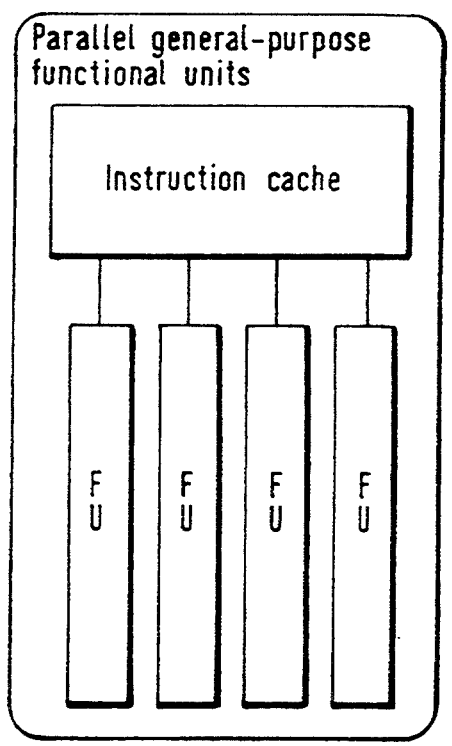
FIG. 4 shows a conventional processor scheme with parallel general purpose functional units. Multiple instructions are issued at one cycle.
Figure 4B:
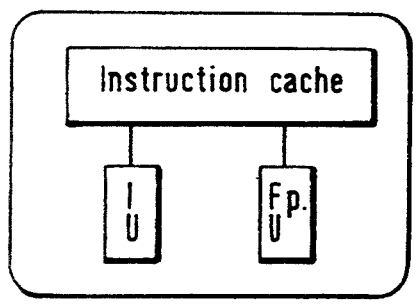
FIG. 4b shows another prior art processor scheme where instructions at compile time are organized to fit the special functional units. This organization is able to issue two instructions at one cycle.
Figure 5:
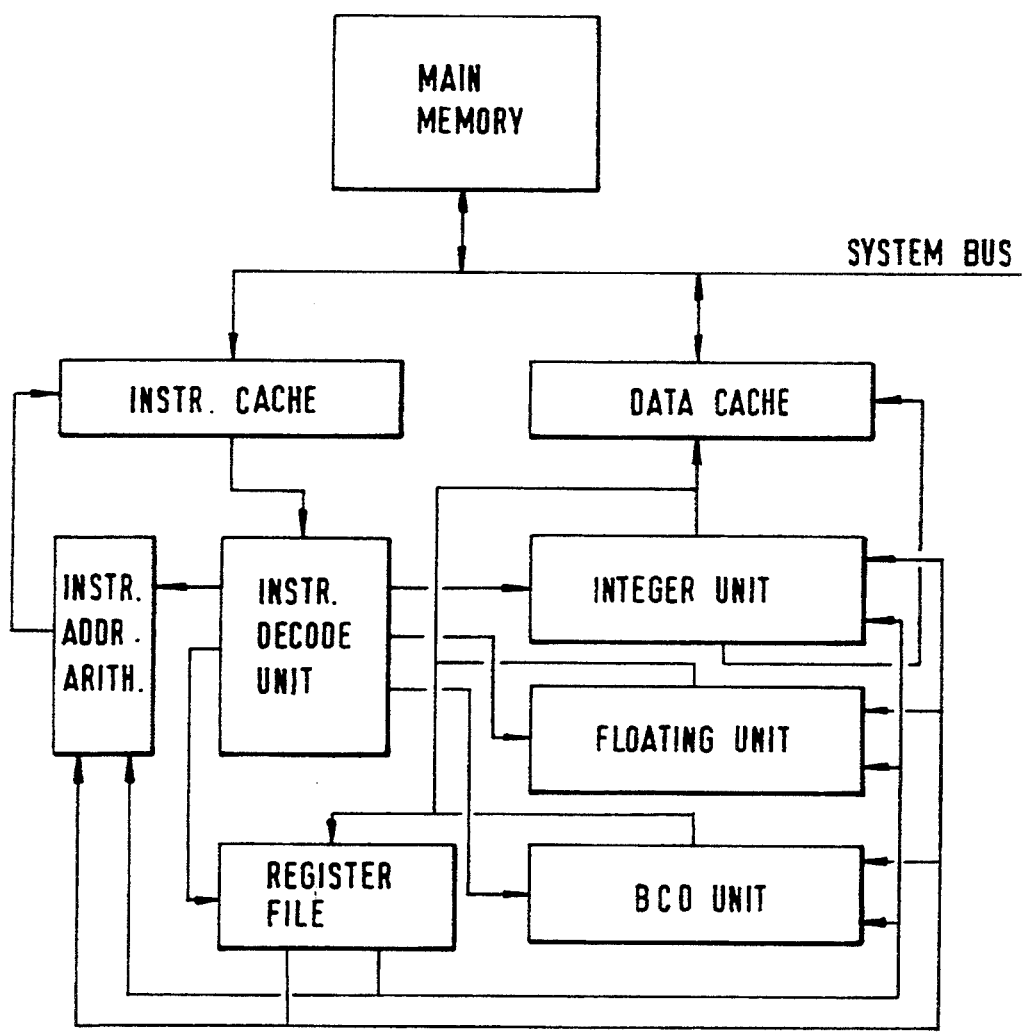
FIG. 5 shows a more detailed block diagram of a conventional processor. The instruction decode logic is placed after the instruction cache. Every instruction fetched from the instruction cache is decoded and dispatched in sequence to one of the special functional units.

FIG. 5 shows the block diagram of a conventional processor. The instruction cache of this system contains a bit per bit copy of the contents of the main memory. The organization of this cache may be so that it has wider lines, i.e. each instruction cache line may contain a number of instructions that are bit per bit copies of their associated locations in the main memory. The reason for a different organization of the cache as opposed to main memory is the need for prefetching of instructions, i.e. instead of fetching one instruction per access, a number of instructions may be read out of the cache per access. Also, the replacement or filling of a cache line with more than one instruction upon a cache miss, means that the hit rate will be higher because the probability for needing the next instruction(s) after a miss, is in the 90% range. This is usually called forward fetch.

The organization of the cache is defined by the way the address bits are assigned. When the main memory is addressed with all address bits to index the memory array, the cache is addressed by a portion of the address bits as shown in FIG. 10. The least significant bits are used to select instruction within a cache line, and the most significant part is used with the cache directory to determine if it is a hit or miss. The directory part may be organized differently with different sizes of caches in order to obtain optimum hit rate. This is, however, insignificant for the present invention.

Figure 6:
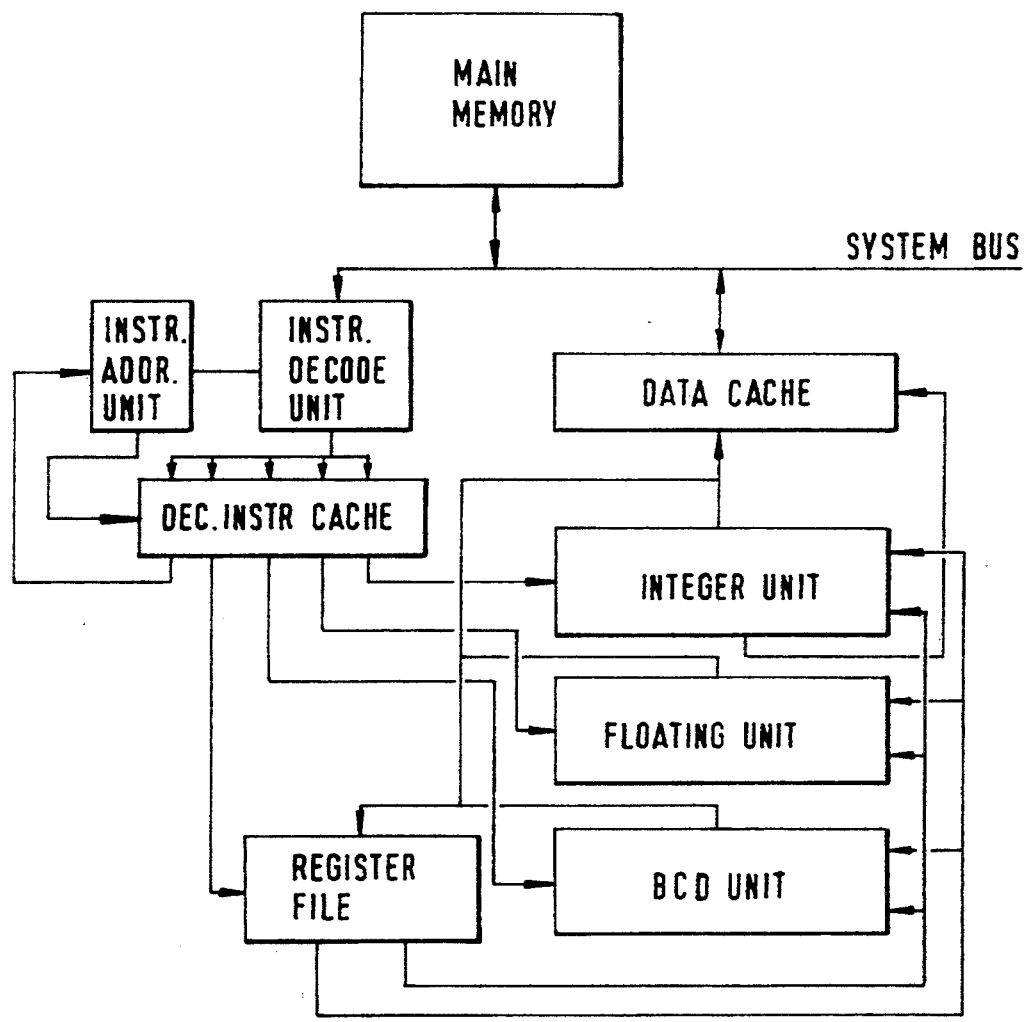
FIG. 6 shows a more detailed block diagram of the present invention. The instruction decode logic is placed in front of the instruction cache. Every instruction fetched from main memory is decoded and placed in a special instruction cache field. All instructions in that field are dispatched in parallel to the special functional units.

FIG. 6 shows a simplified block diagram of a processor utilizing an instruction cache with the instruction folding technique. The instruction cache itself is located between the decoding stage and the execution units and controls those units directly. This means that the bit pattern in the instruction cache is not a bit per bit copy of the instruction memory, it contains pre-decoded information and classifies as a decoded instruction cache. Furthermore, its lines are addressed down to the least significant instruction address bit as shown in FIG. 11.

Each line is divided in several fields, each capable of controlling one special functional unit. Upon filling the cache at "miss" time, it is also determined which special functional unit is needed for execution, and the instruction is then stored in the relevant field of the line. During this operation, the instruction cache address is frozen to be the address of the first instruction that is put into the cache line while the instruction address to main memory is incremented and new instructions are fetched and decoded until no special functional unit control field is available for the current instruction.

Subsequently, not all fields of all instruction cache lines will be utilized, but any cache organization has less than 100% utilization due to cache address overlapping. This cache architecture will have high utilization because the instructions that are put together will only occupy the cache line address of the first instruction, leaving the other addresses free to be used for other instructions.

A second I-cache subdirectory which is not necessary for the principal operation of the invention is introduced in order to increase the cache utilization further, refer to FIG. 11. The two subdirectories has one valid bit per instruction per. subdirectory, and those valid-bits are mutually exclusive, only one may be set at a time meaning that an 8 instruction per line cache has 16 valid-bits. This means that instructions from different addresses with a modulo cache size difference may be resident in one cache line at any time. The valid-bits of the related subdirectory control which instructions from the line shall execute down the pipeline. The subdirectory may be selected by a higher order address bit, a mode bit specifying user or supervisor mode or the replacement algorithm may be chosen as for a two-way set associative cache. For reasonably big caches a random replacement gives approximately the same hit rate as a least-recently-used algorithm. The simplest method of just using the address bit directly above the most significant address bit of the instruction cache address will probably be a simple and efficient solution.

Our invention shown in FIG. 6 has a 64 bit data path from the memory to the instruction dispatch unit. With a 32-bit instruction length this means that the IDU handles two instructions per cycle at instruction cache miss time. This is necessary in order to keep the miss/hit ratio at a reasonably low level which is very important for keeping high sustained performance for various applications.

The IDU evaluates the instructions at miss-time for conflicts of two kinds: If there is an available resource field in the instruction cache line for the operation specified by the instruction, and for data dependencies between destination register for one instruction and source register for another. In the present implementation it is allowed for up to four first generation destination-source conflicts per instruction cache line. This evaluation of instructions in the IDU is referred to as the "Instruction Folding Algorithm".

Still at "miss" time when the two instructions fetched from memory have been evaluated by the IDU, they are sent down the pipeline for execution. Feedback from the functional units concerning status information from instructions that may affect program flow is fed back to the IDU for storing in the cache the most probable way for the program to flow, the branch prediction, and also for deciding if the next instructions already prefetched from memory are in the right path. At this point the address of the instruction cache is still kept equal to the address of the first instruction that was put into the line. It will be so until there is no resource field available for the required operation, or if there are too many destination-source conflicts of first generation, or a second generation conflict occurs.

There is one exception from this rule and that concerns unconditional branches. In any instruction cache line there may be an indefinite number of unconditional branches, because the target address of the branch is calculated and stored in the "Next Address" (NADDR) field in the instruction cache. If another unconditional branch is detected before the line is "full" for other reasons, the new address will again be put into the NADDR field overwriting the previous value which is no longer relevant. This technique is efficiently removing all unconditional branches at cache hit seen from an execution time perspective.

Conditional branches behave more like the rest of the instructions in the way that the number per line is limited by the available resource fields. However they impose the need for some mechanisms to handle conditional storing of destination registers for the instructions within the cache line that follow the branch instruction logically. This is done with a bit in the resource field in the instruction cache line for each functional unit. If this bit is set, the result of the operation performed by a functional unit will not be stored in the destination register before the condition selected is true.

The problem of generating the address of the branch target instruction, is solved by the present invention on "hit" in the instruction cache. The size of caches with access and cycle times that match well with the processing elements cycle time, are now getting big enough to provide hit rates in the upper 90% range. This solution yields high efficiency. The target address of the branch is calculated at miss time and stored in the cache together with other instructions. The alternative address for conditional branches is also calculated and stored together with a prediction code for the most probable one to use. This means that unconditional branches and correctly predicted conditional branches will effectively execute in zero time upon cache hit.

In order to accomodate multi-way branching, the cache line has two additional address fields for storing the alternative addresses of two other instructions. This actually means that a four-way branch may be handled in one instruction cache line, it is a combination of two conditional branches in one line. This is claimed to be a unique feature of the present invention and one of great importance for the performance because of the high frequency of conditional branches of 15%-20% for most any application.

Also the branches will be subject to branch prediction and the address of the most probable instruction to follow the branch will be stored in the NADDR-field of the cache. The predicted way may change during program execution and the branch prediction bits will be updated dynamically to select either one of the two auxiliary address fields in the line instead of the NADDR if the program path changes. This technique "hides" conditional branches that are correctly predicted among data manipulating instructions, just like the unconditional ones.

At instruction cache-hit, the instructions that have been "folded" into the line will be ready for execution by the special functional units in parallel, and will proceed down the pipeline in parallel or in the order determined by the register scoreboard if there are any data dependencies present. The next line to follow will be addressed directly by the NADDR field if this is the predicted address, and will proceed down the pipeline until true or false condition is detected if a conditional branch is present, and in case of incorrect prediction, one of the two auxiliary address fields will be selected and execution will proceed from this address with the necessity of running a couple of "empty" cycles before the pipeline is filled again.

If the outcome of a branch is pointing to an instruction address that generates a cache miss because the instruction is already present in a line identified by another instruction's address, the result will simply be an instruction cache miss, the branch target instruction will be fetched from memory once more and put into the instruction cache line identified by the branch target instruction's own address. In other words, this means that branch targets may exist both as a part of another instruction address line and as a line for itself with possible other instructions as "tail".

Referring to FIG. 12, the format of the basic decoded block and the subdirectory in our first implementation based on the present invention is given. A basic decoded block can control 1 load/store unit, 1 branch unit, 2 integer units and one floating point unit. In addition there is a complex register file with up to 20 ports for simultaneous read/write. Our first computer system will have one or two of these basic blocks.

A subdirectory consists of an address tag to identify the cache contents. It further has a valid field which identifies each instruction as either being present or not. An instruction not present is not executed. The NADDR field points to the next instruction. Our computer system of the present invention will have one or two subdirectories.

We claim:

1. In a general purpose computer having specialized functional units for parallel execution of instructions utilizing an instruction cache with one or more directories for parallel access to instructions issued to the functional units simultaneously, the instruction cache comprising:

instruction cache lines each having a plurality of instruction cache fields coupled to respective functional units for controlling the functional unit to perform a specialized function;

instruction dispatch means for loading the fields with instructions fetched from a main memory of the computer, said dispatch means decoding a portion of the instruction to determine the field into which the instruction is loaded, the dispatch means loading a first instruction on the line into a respective field according to the functional unit the instruction requires, the dispatch means loading additional instructions into respective fields on the line according to predetermined criteria; each line being addressable by the address of the first instruction only and having an address field pointing to an instruction to be executed after completion of the instruction sequence in the current line.

2. A computer system in accordance with claim 1, comprising a first field in each decoded cache line controlling the execution of a conditional branch instruction and a second field therein directly pointing to the instruction sequence that, if the branch is taken, is executed.

3. A computer system in accordance with claim 1 comprising each instruction cache directory being organized with at least two subdirectories with each subdirectory accomodating a unique program sequence.

4. A computer system in accordance with claim 3, wherein each subdirectory has a unique address tag identifying the cache contents and unique valid bits per instruction identifying the program sequence, and the valid bits of the different subdirectories are mutually exclusive.

5. A computer system in accordance with claim 1 wherein each cache line contains a specialized field to point to an alternative next instruction sequence.

6. A computer system in accordance with claim 5, wherein each basic decoded line contains fields for one memory instruction, one conditional branch instruction and two single precision arithmetic or logic instructions or one double precision arithmetic or logic instruction.

7. A computer system in accordance with claim 5, wherein an unconditional branch instruction does not occupy any separate field in the decoded cache line but is processed by updating the field pointing to the line containing the next instruction sequence to be executed.

8. A computer system in accordance with claim 1 wherein the actual number of occupied fields in a cache line is determined at program execution time.

* * * * *